US008988393B2

United States Patent
Su et al.

(10) Patent No.: US 8,988,393 B2
(45) Date of Patent: Mar. 24, 2015

(54) OPTICAL TOUCH SYSTEM USING OVERLAPPING OBJECT AND REFLECTION IMAGES AND CALCULATION METHOD THEREOF

(75) Inventors: Tzung Min Su, Hsinchu (TW); Hsin Chia Chen, Hsinchu (TW); Chih Hsin Lin, Hsinchu (TW); Cho Yi Lin, Hsinchu (TW)

(73) Assignee: Pixart Imaging Inc., Hsin-Chu (TW)

( * ) Notice: Subject to any disclaimer, the term of this patent is extended or adjusted under 35 U.S.C. 154(b) by 225 days.

(21) Appl. No.: 13/524,341

(22) Filed: Jun. 15, 2012

(65) Prior Publication Data

US 2012/0327037 A1 Dec. 27, 2012

(30) Foreign Application Priority Data

Jun. 21, 2011 (TW) .............................. 100121546 A

(51) Int. Cl.
*G06F 3/042* (2006.01)
*G06F 3/041* (2006.01)

(52) U.S. Cl.
CPC ............ *G06F 3/0421* (2013.01); *G06F 3/0416* (2013.01)
USPC ....................................... 345/175; 178/18.09

(58) Field of Classification Search
CPC ..... G06F 3/042; G06F 3/0421; G06F 3/0423; G06F 3/0425; G06F 3/0428
USPC ....................................... 345/175; 178/18.09
See application file for complete search history.

(56) References Cited

U.S. PATENT DOCUMENTS

| 4,782,328 | A | 11/1988 | Denlinger |
|---|---|---|---|
| 5,484,966 | A * | 1/1996 | Segen .......................... 178/18.09 |
| 7,689,381 | B2 | 3/2010 | Lin et al. |
| 2005/0057533 | A1* | 3/2005 | Liu ................ 345/179 |
| 2005/0200612 | A1 | 9/2005 | Tanaka et al. |
| 2005/0243070 | A1* | 11/2005 | Ung et al. ...................... 345/176 |
| 2009/0278795 | A1* | 11/2009 | Hansen et al. ................. 345/156 |
| 2010/0090950 | A1* | 4/2010 | Chen et al. ...................... 345/158 |
| 2011/0061950 | A1* | 3/2011 | Cheng et al. ................. 178/18.09 |
| 2011/0115904 | A1* | 5/2011 | Te-Yuan et al. ................ 348/135 |
| 2011/0122097 | A1* | 5/2011 | Tsang et al. ..................... 345/175 |
| 2011/0199337 | A1* | 8/2011 | Tang et al. ..................... 345/175 |

(Continued)

FOREIGN PATENT DOCUMENTS

CN 102016772 A 4/2011

OTHER PUBLICATIONS

Office Action from People's Republic of China State Intellectual Property Office in the corresponding Chinese Application 201110182513.5 dated Oct. 17, 2014, 8 pp. in Chinese, with partial English translation.

(Continued)

*Primary Examiner* — Jonathan Boyd
*Assistant Examiner* — James Nokham
(74) *Attorney, Agent, or Firm* — Juan Carlos A. Marquez; Bacon & Thomas PLLC

(57) ABSTRACT

A method of calculating the coordinate data of an object includes the steps of: providing a mirror surface for generating a reflection of an object; providing an image sensor for capturing an image of the object and an image of the reflection; obtaining an individual image of the object when the image of the object and the image of the reflection overlap to form an overlapped image; and calculating the coordinate data of the object based on the overlapped image and the individual image.

11 Claims, 16 Drawing Sheets

(56) References Cited

U.S. PATENT DOCUMENTS

2012/0050224 A1* 3/2012 Chung et al. .................. 345/175
2012/0205166 A1* 8/2012 Huang et al. ............... 178/18.09

OTHER PUBLICATIONS

Search Report from People's Republic of China State Intellectual Property Office in the corresponding Chinese Application 201110182513.5 dated Oct. 9, 2014, 2 pp. in Chinese.

* cited by examiner

-- Prior Art --

-- Prior Art --

OPTICAL TOUCH SYSTEM USING OVERLAPPING OBJECT AND REFLECTION IMAGES AND CALCULATION METHOD THEREOF

CROSS-REFERENCE TO RELATED APPLICATION

The present application is based on, and claims priority from, Taiwan Patent Application Serial Number 100121546, filed on Jun. 21, 2011, the disclosure of which is hereby incorporated by reference herein in its entirety.

BACKGROUND

1. Technical Field

The present invention relates to an optical touch system and an object coordination data calculation method thereof.

2. Related Art

Touch screen devices allow users to interact directly on screen with application programs. One of the more common types of touch screen devices is the optical touch screen device.

FIG. 1 shows a current optical touch screen system 1 disclosed in U.S. Pat. No. 4,782,328. As shown in FIG. 1, the optical touch screen system 1 comprises two image sensors 11 configured to capture the image of an object 13 on a touch screen 12. The processor 14 coupled with the two image sensor 11 processes the images from the two image sensors 11 to decide the sensing paths 15 respectively connecting the object 13 and the two image sensors 11. The processor 14 calculates the coordinates of the object 13 using the sensing paths 15. The optical touch screen system 1 needs two image sensors 11, making it expensive.

FIG. 2 shows another current optical touch screen system 2. U.S. Pat. No. 7,689,381 B2 (or counterpart Taiwan Publication Patent No. 201003477) discloses an optical touch screen system 2 targeted at reducing cost of production. The optical touch screen system 2 comprises a mirror 21, two light sources 22, an image sensor 23, and a processor 24. The mirror 21 and the two light sources 22 are disposed at the periphery of a touch area. The mirror 21 is configured to generate a reflection 26 of an object 25. The image sensor 23 is configured to generate an image of the object 25 and an image of the reflection 26. The processor 24 determines a sensing path 27 passing through the image of the object 25 and another sensing path 27 passing through the image of the reflection 26, and then calculates the coordinates of the object 25 using the two sensing paths 27. The optical touch screen system 2 needs only one image sensor 23, making it relatively cost effective.

In the optical touch screen system 2, the image of the object 25 and the image of the reflection 26 may overlap when the two sensing paths 27 get too close to each other, in which case the position of the object 25 cannot be calculated. To address this problem, U.S. Patent Publication No. 2010/0090950 A1 (or counterpart Taiwan Publication Patent No. 201101131) discloses a calculation method. The calculation method utilizes the image of the object 25 and a predetermined dimension of the object 25 to calculate the coordinates of the object 25 when the image of the object 25 and the image of the reflection 26 overlap. In the calculation method, the orthographic projection of the object 25 on the touch area is assumed as a circular projection whose radius is used as the above predetermined dimension. However, users may use fingers or other soft objects to operate the optical touch screen system, and such types of object cannot always create a fixed predetermined dimension. As a result, errors may occur in coordinate data calculation.

SUMMARY

One embodiment of the present invention proposes a method of calculating coordinate data of an object. The method comprises the steps of providing a mirror surface for generating a reflection of an object; providing an image sensor for capturing an image of the object and an image of the reflection; capturing an individual image of the object when the image of the object and the image of the reflection overlap to form an overlapped image; and calculating coordinate data of the object based on the overlapped image and the individual image.

Another embodiment of the present invention discloses a method of calculating coordinate data of an object. The method comprises the steps of providing a light projecting device comprising a mirror surface configured to generate a reflection of an object; providing an image sensor for capturing an image of the object and an image of the reflection, wherein a height of the image of the reflection is less than that of the image of the object; and determining an exposed portion of an edge of the image of the object within an overlapped image formed by the image of the object and the image of the reflection when the overlapped image is detected.

In one embodiment, the light projecting device further comprises a non-mirror surface, wherein the mirror surface and the non-mirror surface are arranged along a direction perpendicular to a touch surface.

In one embodiment, the method further comprises a step of providing a light filter device covering a portion of a light receiving surface of the image sensor and configured to block light of a first frequency spectrum, wherein the light projecting device comprises a light filter member disposed on the mirror surface and configured to let the light projecting device reflect light of the first frequency spectrum.

One embodiment of the present invention proposes an optical touch system, which comprises a light projecting device, an image sensor, and a processor. The light projecting device comprises a mirror surface, which is configured to generate an image of an object. The image sensor may be configured to capture an image of the object and an image of the reflection. The image sensor may also be configured to capture an individual image of the object. The processor is configured to calculate, when the image of the object and the image of the reflection form an overlapped image, coordinate data of the object according to the overlapped image and a center of gravity or a center point of the individual image, or according to two edges of the overlapped image and an exposed portion of an edge of the image of the object within the overlapped image.

To provide a better understanding of the above-described objectives, characteristics and advantages of the present invention, detailed explanation is provided in the following embodiments with reference to the drawings.

BRIEF DESCRIPTION OF THE DRAWINGS

The invention will be described according to the appended drawings in which.

DETAILED DESCRIPTION OF DISCLOSED EMBODIMENTS

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

One embodiment of the present invention discloses a method of calculating coordinate data of an object. The method obtains an individual image formed by an object when the image of the object and the image of a reflection of the object overlap to form an overlapped image, and uses the overlapped image and the individual image to determine the coordinate data of the object. Various methods can be used to obtain the individual image when the image of the object and the image of the reflection of the object overlap, and all such methods can be utilized in the embodiments of the present invention. For example, the individual image can be obtained by changing the illumination manner of an illumination system in an optical touch system to prevent the generation of the image of the reflection, or the individual image can be obtained by blocking the light forming the image of the reflection to only allow the light forming the image of the object to be incident on the image sensor, or the individual image can also be obtained by reducing the height of the image of the reflection to obtain a portion of the image of the object not to be overlapped by the image of the reflection as an individual image.

Figure 1:
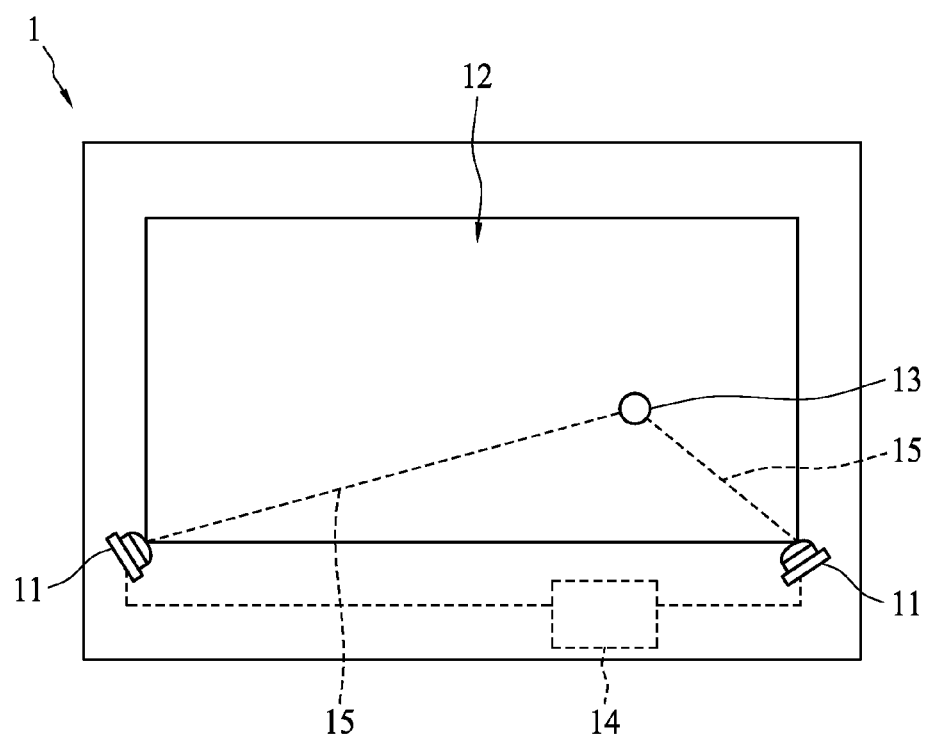
FIG. 1 shows a current optical touch screen system disclosed in U.S. Pat. No. 4,782,328.
Figure 2:
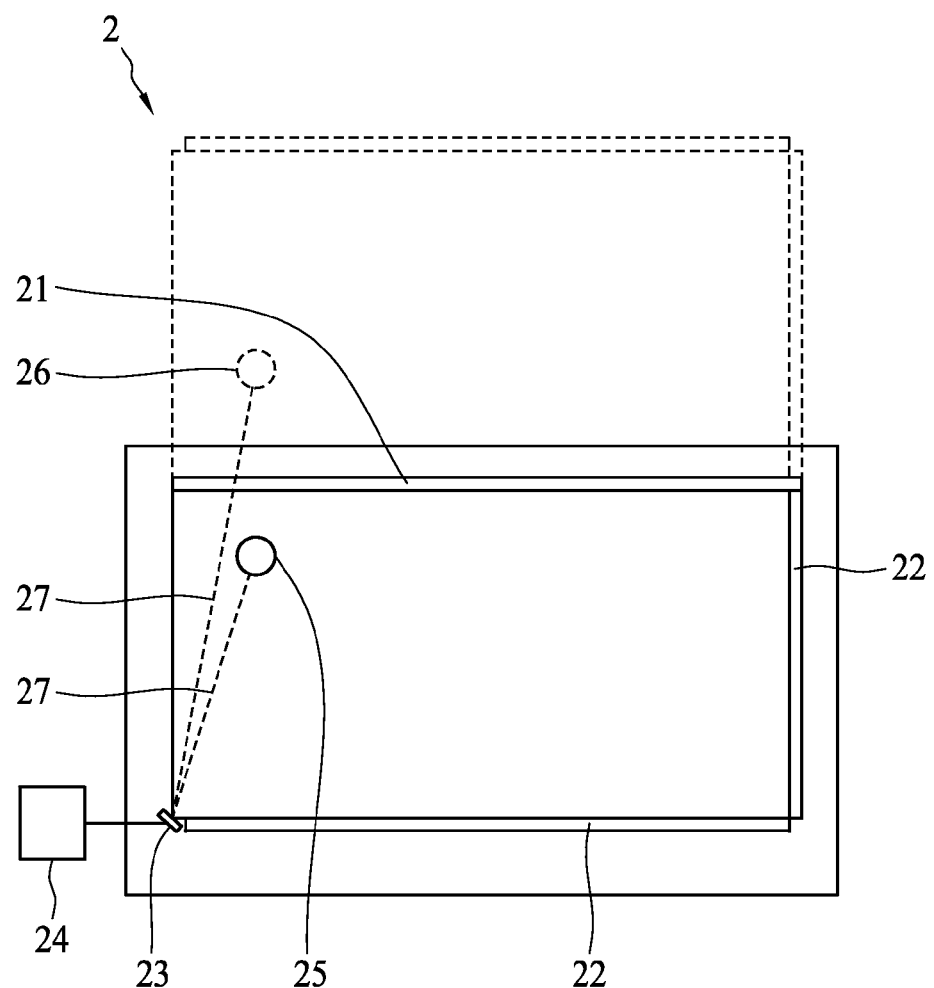
FIG. 2 shows another current optical touch screen system.
Figure 3:
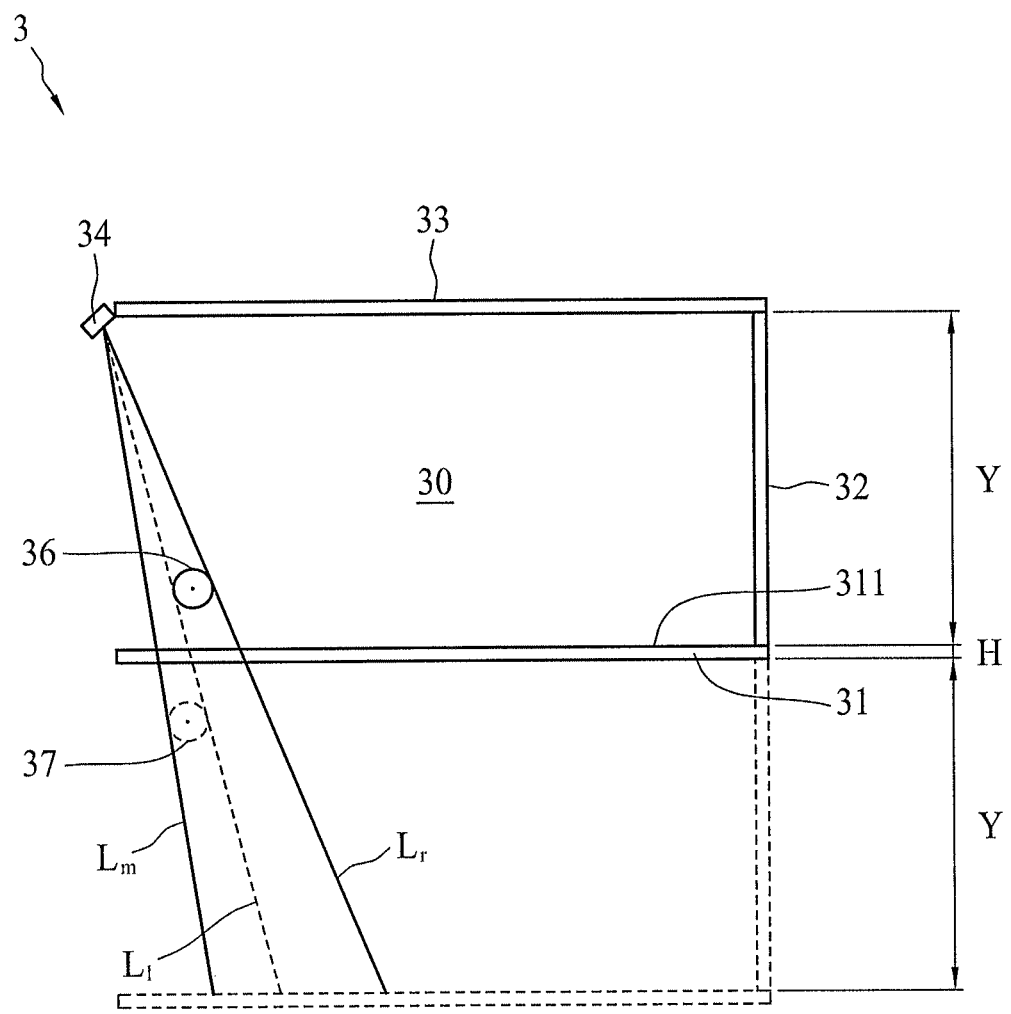
FIG. 3 is an illustration schematically depicting an optical touch system according to one embodiment of the present invention.
Figure 4:
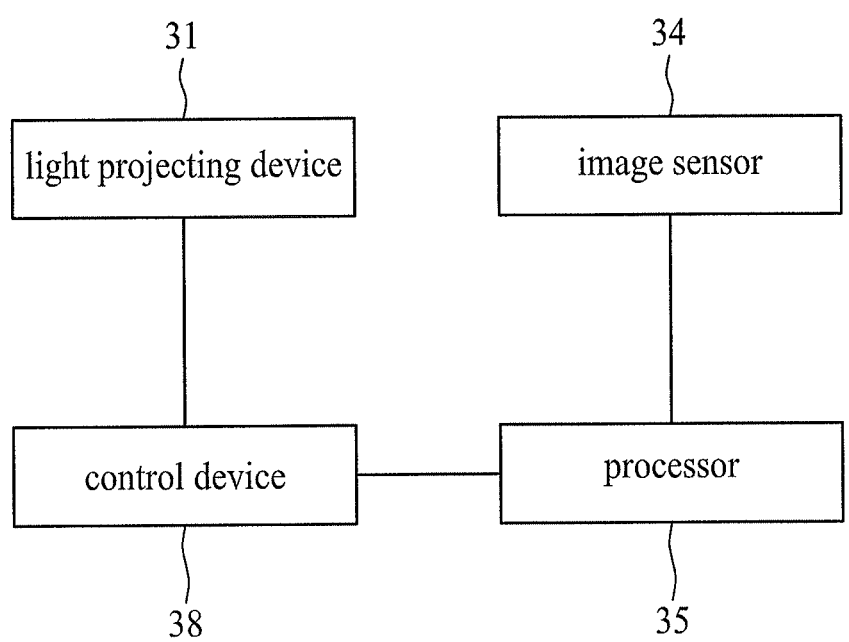
FIG. 4 is a block diagram of an optical touch system according to one embodiment of the present invention.
Figure 5:
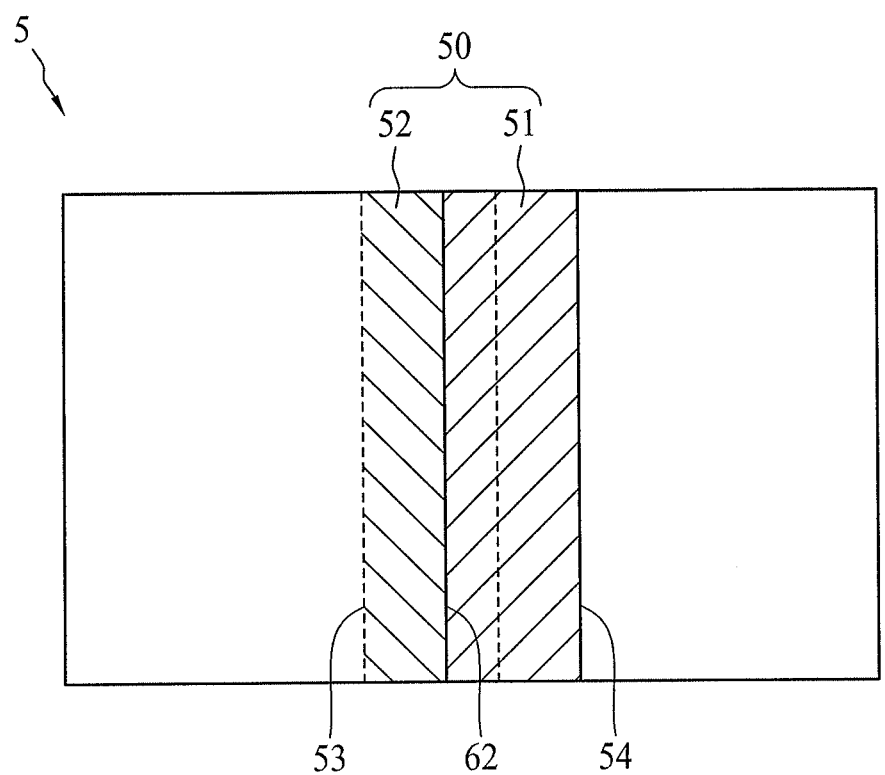
FIG. 5 schematically depicts an image of the object overlapping a captured reflection according to one embodiment of the present invention.
Figure 6:
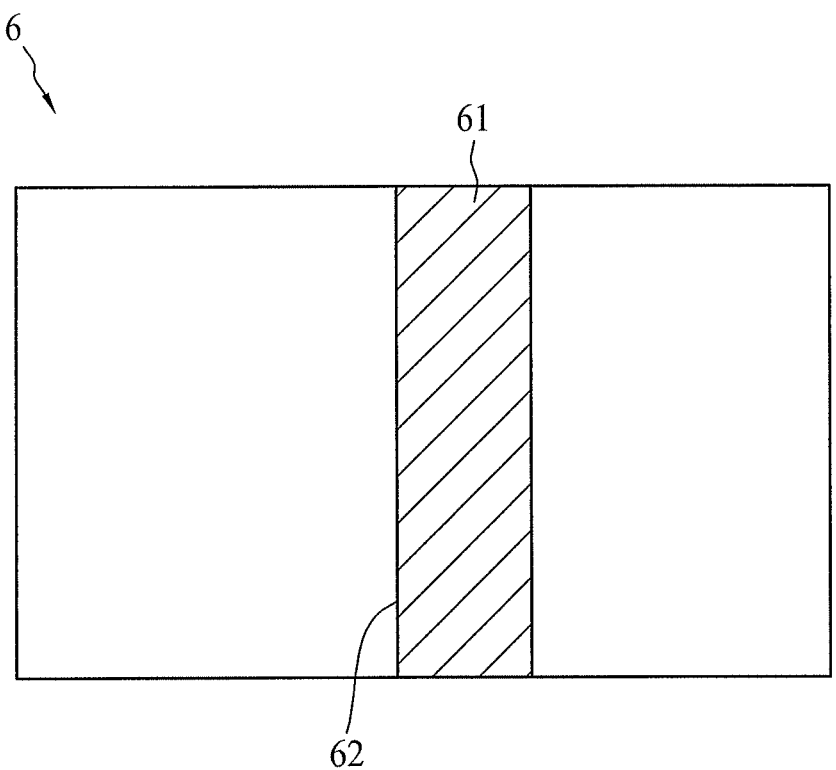
FIG. 6 schematically depicts an individual image according to one embodiment of the present invention.

FIG. 3 is an illustration schematically depicting an optical touch system 3 according to one embodiment of the present invention. FIG. 4 is a block diagram of an optical touch system 3 according to one embodiment of the present invention. Referring to FIGS. 3 and 4, the optical touch system 3 comprises a light projecting device 31, an image sensor 34, and a processor 35. The light projecting device 31, disposed adjacent to a touch surface 30, comprises a mirror surface 311. The mirror surface 311 is configured to face the side where the touch surface 30 is located. The mirror surface 311 can generate a reflection 37 of an object 36 on the touch surface 30. The image sensor 34 is configured to generate a picture 5, as shown in FIG. 5, in an extensive area on the touch surface 30. The picture 5 may comprise an image 51 formed by the object 36 and an image 52 formed by the reflection 37. The image sensor 34 may also be configured to capture another picture 6, as shown in FIG. 6. The picture 6 comprises an individual image 61 formed by the object 36 on the touch surface 30. In one embodiment, the image 51 can be a shadow image, which is darker than the background portion of the picture of FIG. 5. In another embodiment, the image 51 may be a reflected light image, which is brighter than the background portion of the picture of FIG. 5. The processor 35 is coupled to the image sensor 34. The processor 35 is configured to analyze the image 51 of the object 36 and the image 52 of the reflection 37 to determine the coordinate data of the object 36.

During the analysis of the picture 5 by the processor 35, when the processor 35 detects that the image 51 and the image 52 of the reflection 37 are connected or overlap to form an overlapped image 50, the processor 35 may proceed to analyze the individual image 61 of the object 36 and an overlapped image 50 to obtain the coordinate data of the object 36.

The method of calculating the coordinate data of the object 36 is demonstrated as follows. Referring to FIGS. 3, 5 and 6, the processor 35 analyzes the overlapped image 50 to determine the edges 53 and 54 of the overlapped image 50. According to the edges 53 and 54, the processor 35 can determine the viewing lines $L_r$ and $L_m$ extending from a predetermined origin point and respectively passing through the edges 53 and 54. $L_r$ and $L_m$ can be represented by the following equations:

$$L_m: y = m_m x + b_m \quad (1)$$

$$L_r: y = m_r x + b_r \quad (2)$$

Moreover, the processor 35 analyzes the picture 6 to determine the edge 62 of the individual image 61 whose corresponding edge is hidden within the overlapped image 50. Next, the processor 35 determines the viewing line $L_1$ extending from the origin point and passing through the edge 62 according to the position of the edge 62. The viewing line $L_1$ can be described by the following equation.

$$L_1: y = m_1 x + b_1 \quad (3)$$

Thereafter, the parameters of the equations of the viewing lines $L_r$, $L_m$ and $L_1$, the height (Y) of the screen, and the thickness (H) of the light projecting device are incorporated into the following equations to calculate the coordinate data $(x_0, y_0)$ of the object 36 and the radius (r) of the object 36.

$$r = \frac{(2Y + 2H - b_m - b_l)(m_l - m_r) - (b_r - b_l)(m_m + m_l)}{(M_l + M_r)(m_m + m_l) - (M_m + M_l)(m_l - m_r)} \quad (4)$$

$$x_o = \frac{(2Y + 2H - b_m - b_l) + (M_m + M_l) \cdot r}{(m_m + m_l)} \quad (5)$$

$$y_o = -r \cdot M_l + b_l + m_l x_o \quad (6)$$

$$M_m = \sqrt{m_m^2 + 1} \quad (7)$$

$$M_l = \sqrt{m_l^2 + 1} \quad (8)$$

$$M_r = \sqrt{m_r^2 + 1} \quad (9)$$

As shown in the above calculation method, the coordinate data of the object 36 are determined directly by an overlapped image 50 and an individual image 61. An assumed radius is not necessary. Consequently, the embodied method of the present invention can calculate correct coordinate data of the object 36 even if the size of the object 36 is changed.

Figure 17:
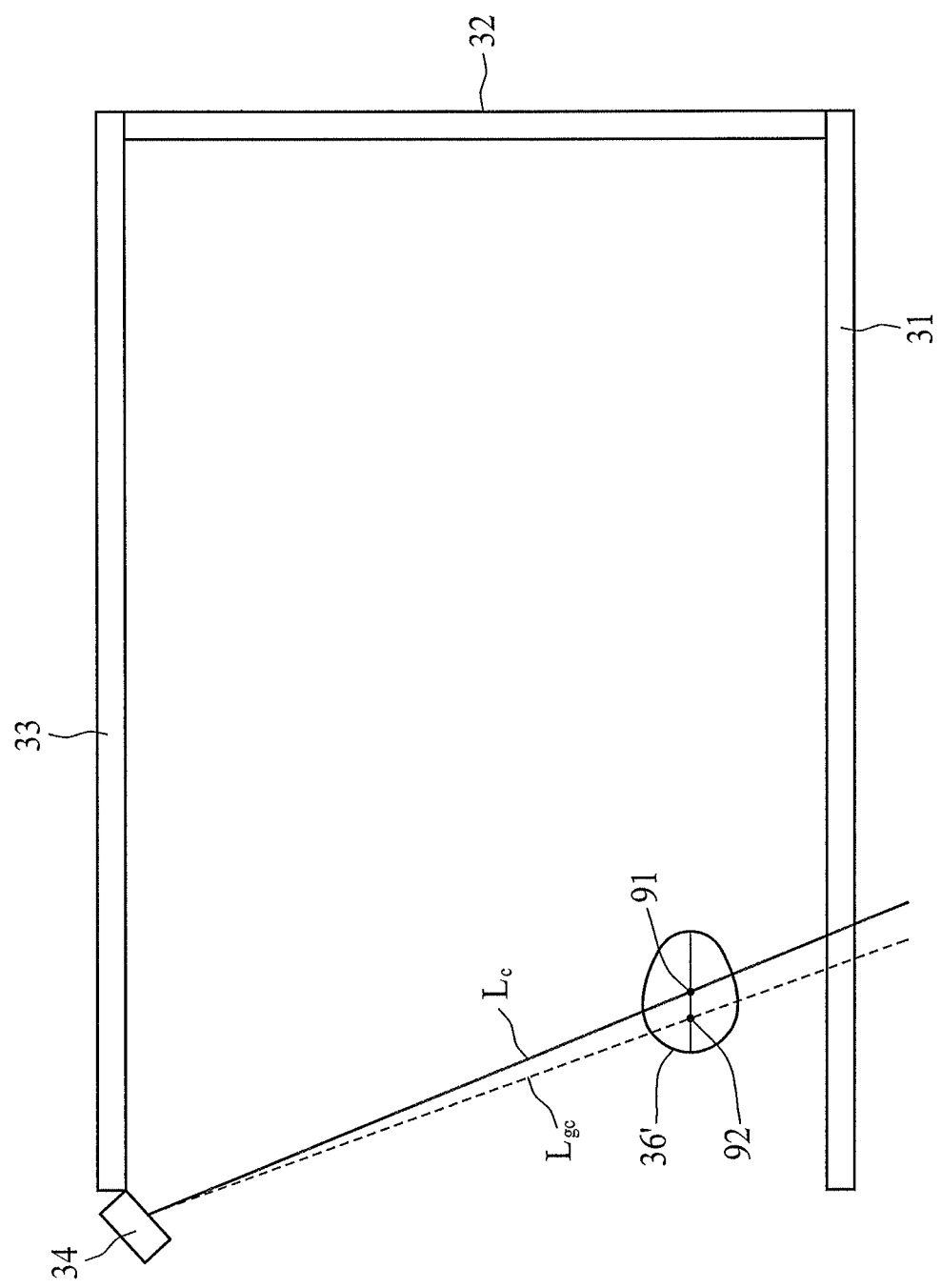
FIG. 17 schematically demonstrates other viewing lines passing through an object according to one embodiment of the present invention.

In addition to using the viewing line $L_1$ extending through the edge 62 of the individual image 61 together with the viewing lines $L_r$ and $L_m$ to determine the coordinate data of the object 36, other viewing lines passing through the object 36 can also be used with the viewing lines $L_r$ and $L_m$ to determine the coordinate data of the object 36. Referring to FIGS. 6 and 17, in one embodiment, after the individual image 61 as shown in FIG. 6 is captured, a center point 91 of the individual image 61 is determined, and then, the equation representing the center line $L_c$ extending through the center point 91 of the individual image 61 is determined. Next, the coordinate data of the object 36 is determined using the equation representing the center line $L_c$, the equation representing the viewing line $L_r$ and the equation representing the viewing line $L_m$.

In another embodiment, as shown in FIGS. 6 and 17, after the individual image 61 as shown in FIG. 6 is captured, a center of gravity 92 of the individual image 61 is determined, and then, the equation representing the gravity center line $L_{gc}$ extending through the center of gravity 92 of the object 36 is determined. Next, the coordinate data of the object 36 is determined using the equation representing the center line $L_{gc}$, the equation representing the viewing line $L_r$ and the equation representing the viewing line $L_m$.

Figure 7:
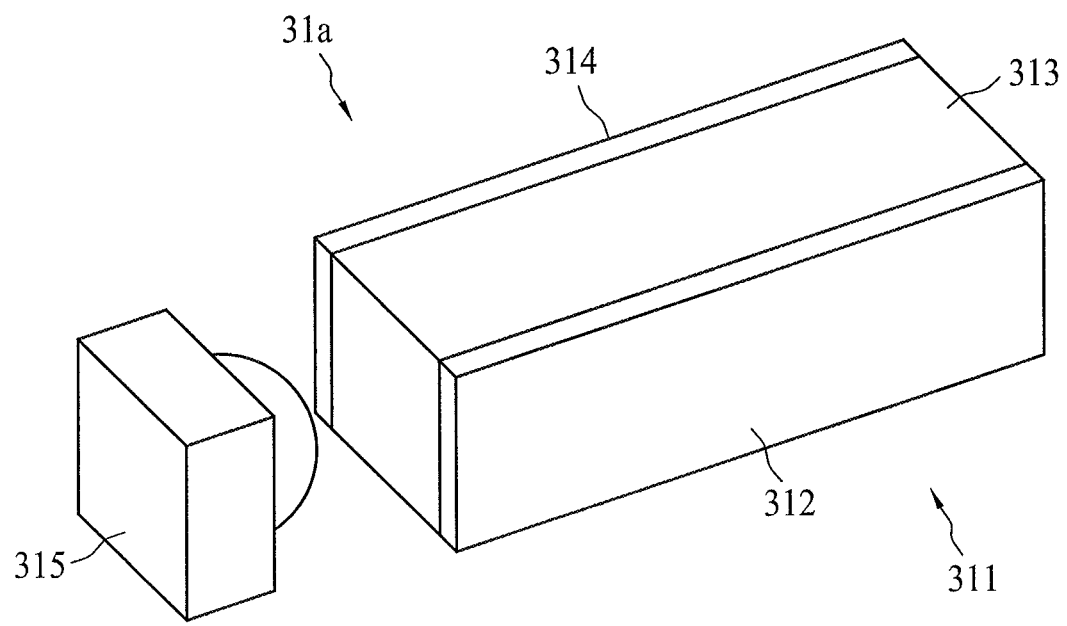
FIG. 7 is an illustration schematically demonstrating a light projecting device according to one embodiment of the present invention.

Referring to FIGS. 3 and 7, various methods can be employed to obtain the individual image 61 of the object 36. In the present embodiment, the light projecting device 31a comprises a light source 315, a mirror coating 312, and a light guide member 313. The light source 315 is disposed adjacent to an end portion of the light guide member 313 to provide light. The light guide member 313 transforms the light projecting device 31a into a linear light source. When the light source 315 is turned off, the mirror coating 312 can create the image of the object 36; while when the light source 315 is turned on, the light from the light source 315 may radiate outward, passing through the mirror coating 312, illuminating the object 36, and overwhelming light reflected by the mirror coating 312 such that the image sensor 34 can only capture an individual image 61 formed by the object 36.

In one embodiment, the light projecting device 31a can further comprise a reflective layer 314, which is configured to reflect light back to the light guide member 313.

Figure 8:
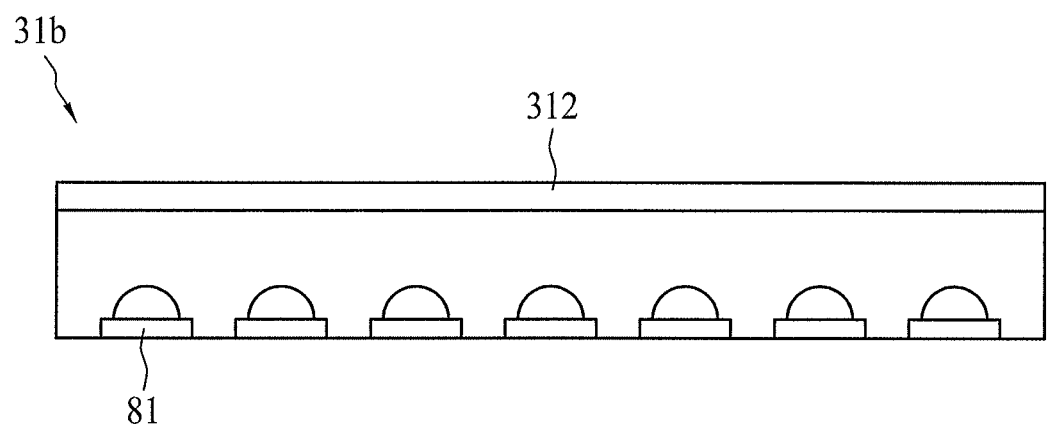
FIG. 8 is an illustration schematically demonstrating a light projecting device according to another embodiment of the present invention.

In another embodiment, as shown in FIG. 8, the light projecting device 31b may comprise a plurality of light sources 81 and a mirror coating 312, wherein the plurality of light sources 81 are arranged in parallel to an edge of the touch surface 30 and the mirror coating 312 is disposed in front of the plurality of light sources 81.

Referring to FIGS. 3 and 4, the optical touch system 3 may further comprise a control device 38 that may be coupled to the light projecting device 31. When the processor 35 detects that the image 51 of the object 36 and the image 52 of the reflection 37 overlap, the control device 38 may turn on the light source of the light projecting device 31, so that the light emits outward from the mirror surface 311 of the light projecting device 31, creating an object shadow on the image sensor 34. The picture that the image sensor 34 captures at this moment shows only the shadow image of the object because the light from the light source overwhelms the light reflected from the mirror surface 311 of the light projecting device 31.

Referring again to FIG. 3, the optical touch system 3 may further comprise a first light projecting device 32 and a second light projecting device 33. The first and second light projecting devices 32 and 33 are disposed adjacent to the touch surface 30 for providing light for forming an image of an object. The first light projecting device 32 may be a light emitting device or a reflective device. The second light projecting device 33 may be a light emitting device or a reflective device.

Figure 9:
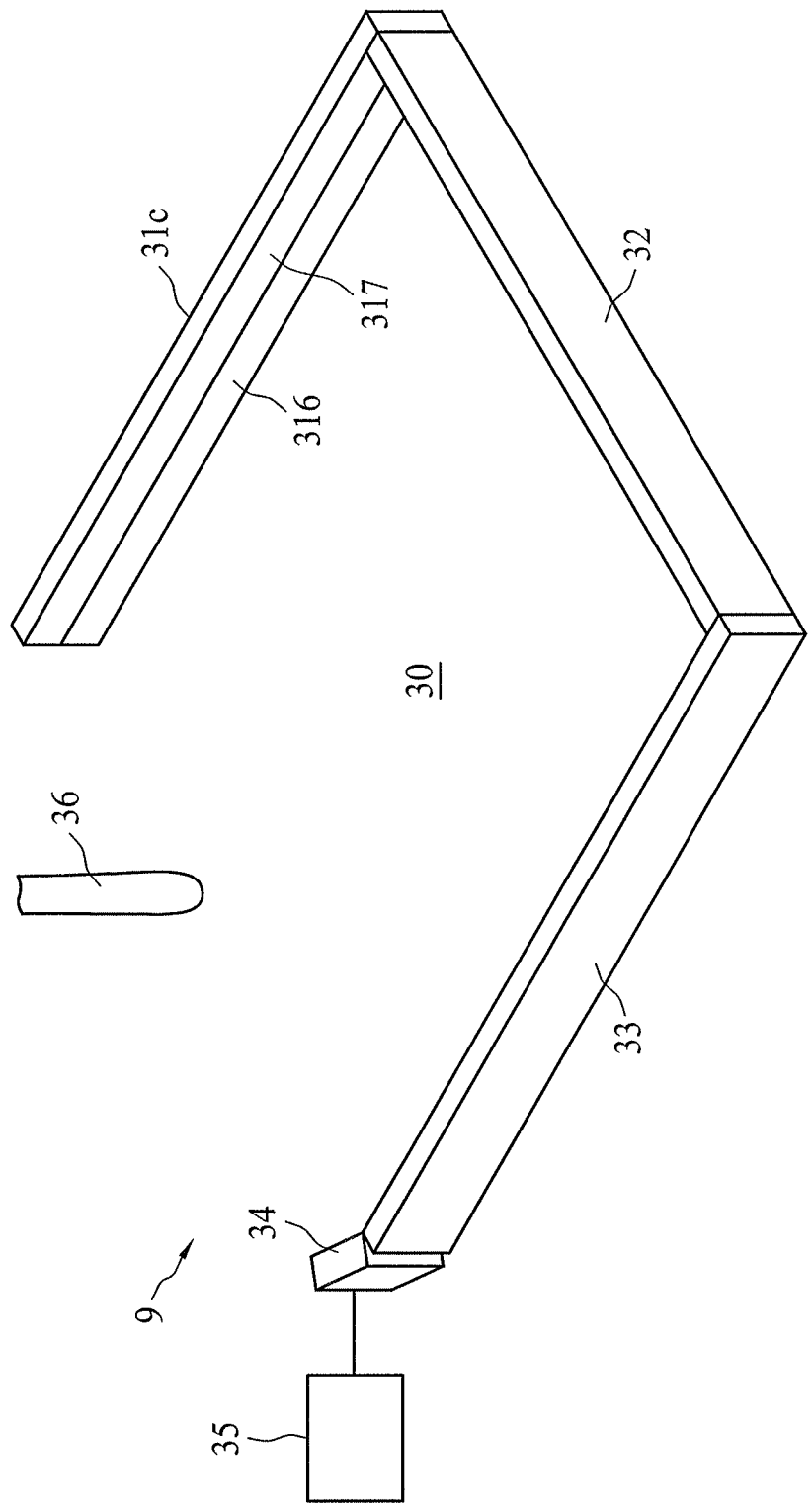
FIG. 9 is an illustration schematically depicting an optical touch system according to another embodiment of the present invention.
Figure 10:
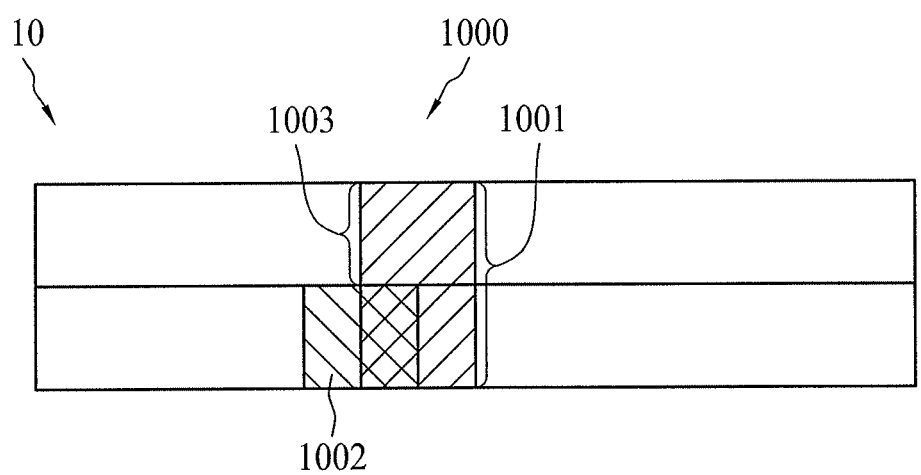
FIG. 10 schematically demonstrates a picture generated by an optical touch system according to one embodiment of the present invention.

FIG. 9 is an illustration schematically depicting an optical touch system 9 according to another embodiment of the present invention. FIG. 10 schematically demonstrates a picture generated by an optical touch system according to one embodiment of the present invention. Referring to FIGS. 9 and 10, the optical touch system 9 comprises a light projecting device 31c, an image sensor 34, and a processor 35. The light projecting device 31c is disposed adjacent to a touch surface 30, and comprises a mirror surface 316 for creating a reflection 37 of an object 36 and a non-mirror surface 317. The mirror surface 316 and the non-mirror surface 317 can be arranged in a direction perpendicular to the touch surface 30. The image sensor 34 is configured to capture the image 1001 of the object 36 and the image 1002 of the reflection 37 of the object 36.

In one embodiment, the non-mirror surface 317 comprises a retro-reflective material, which reflects light back to its source with a minimum scattering of light.

Referring to FIG. 10, in the present embodiment, the light projecting device 31c is configured to face toward the space on the touch surface 30. The upper portion of the light projecting device 31c is configured as the non-mirror surface 317 and the lower portion of the light projecting device 31c is configured as the mirror surface 316. In such a configuration, the image 1002 formed by the reflection 37 covers a portion of the picture in the direction perpendicular to the touch surface 30. As such, when the image 1002 overlaps an edge of the image 1001, the image 1002 merely occupying a partial picture area will not completely cover the whole edge of the image 1001 such that the coordinate data and a size of the object 36 can be calculated using the exposed portion 1003 of the edge and the two edges of the overlapped image 1000. The calculations can be performed using the above equations (1) through (9).

In one embodiment, the light projecting device 31c is a light emitting device, which may comprise a light source and a light guide member, wherein the light from the light source may propagate outward through the non-mirror surface 317.

In one embodiment, the optical touch system 9 may comprise a first light projecting device 32 and a second light projecting device 33. The light projecting device 32 and the second light projecting device 33 are disposed adjacent to the touch surface 30 for providing light for forming an image. The first light projecting device 32 may be a light emitting device or a reflective device. The second light projecting device 33 may be a light emitting device or a reflective device.

Figure 11:
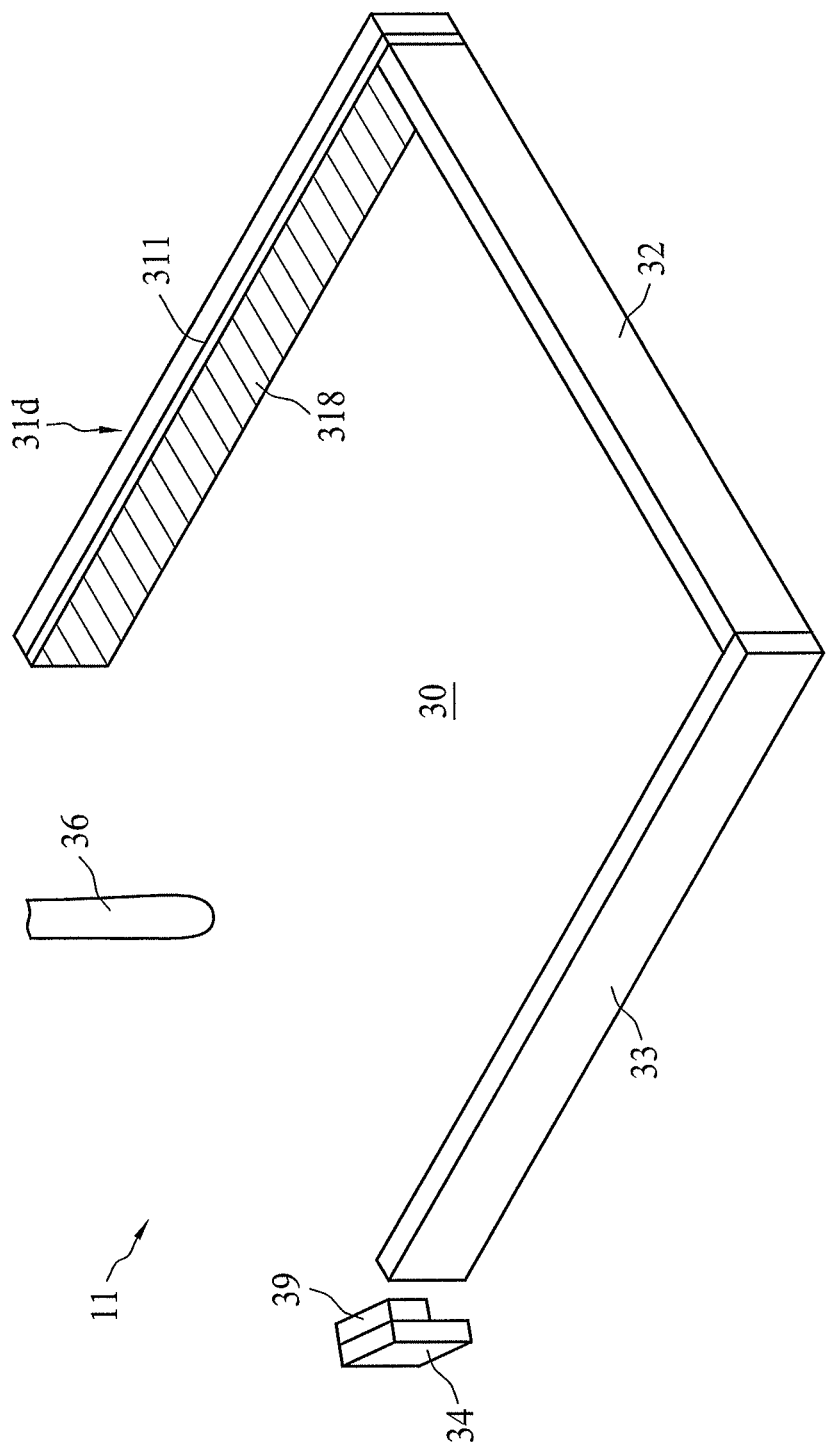
FIG. 11 is an illustration schematically depicting an optical touch system according to another embodiment of the present invention.
Figure 12:
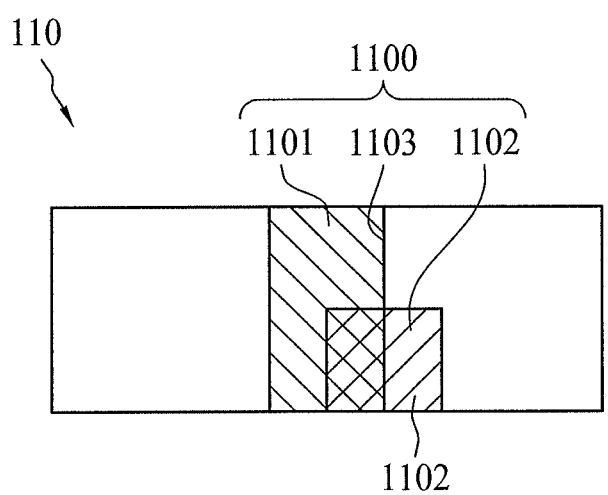
FIG. 12 schematically demonstrates a picture generated by an optical touch system of FIG. 11.

FIG. 11 is an illustration schematically depicting an optical touch system 11 according to another embodiment of the present invention. FIG. 12 schematically demonstrates a picture 110 generated by an optical touch system 11 of FIG. 11. Referring to FIG. 11, the optical touch system 11 comprises a light projecting device 31d, an image sensor 34, and a light filter device 39.

The light projecting device 31d comprises a mirror surface 311 and a light filter member 318, wherein the mirror surface 311 can create a reflection of an object 36. The light filter member 318 is disposed on the mirror surface 311 so that when light is transmitted through the light filter member 318, is reflected from the mirror surface 311, and is transmitted through the light filter member 318, a light component with a first frequency spectrum is left to continue to propagate. In other words, when broad spectrum light is transmitted through the light filter member 318, the light component with the first frequency spectrum can pass through while other light components are blocked by the light filter member 318.

In one embodiment, the light component with the first frequency spectrum can be red light, blue light, or green light.

Referring to FIG. 12, the image sensor 34 is configured to generate a picture 110, which may comprise an image 1101 of the object 36 and the image 1102 of the reflection 37 of the object 36.

As shown in FIG. 11, the light filter device 39 is disposed on the light receiving surface of the image sensor 34, covering a portion of the light receiving surface. The light filter device 39 is configured to block the light with a first frequency spectrum.

In particular, when the light forming the reflection of the object 36 is transmitted through the light filter member 318, the light components other than the light with the first frequency spectrum will be blocked. When the light component with the first frequency spectrum is incident on the image sensor 34, the light filter device 39 will block the light component with the first frequency spectrum so that the image sensor 34 cannot capture a portion of the image of the reflection of the object 36, and as a result, the captured image 1102 of the reflection will only cover a portion of the picture in the direction perpendicular to the touch surface 30 as shown in FIG. 12. On the other hand, the image 1101 on the image sensor 34 is formed by broad spectrum light, and so the image 1101 can extend across the picture 110. As a result, the image 1101 can be higher than the image 1102. Specifically, when the image 1102 overlaps an edge of the image 1101, the image 1102 merely occupying a partial picture area will not completely cover the edge of the image 1101, such that the coordinate data and a dimension of the object 36 can be calculated using the exposed portion of the edge 1103 and the two edges of the overlapped image 1100. The calculations can be performed using the above equations (1) through (9).

In one embodiment, the light filter device 39 comprises a red light filter, a blue light filter, or a green light filter.

Figure 13:
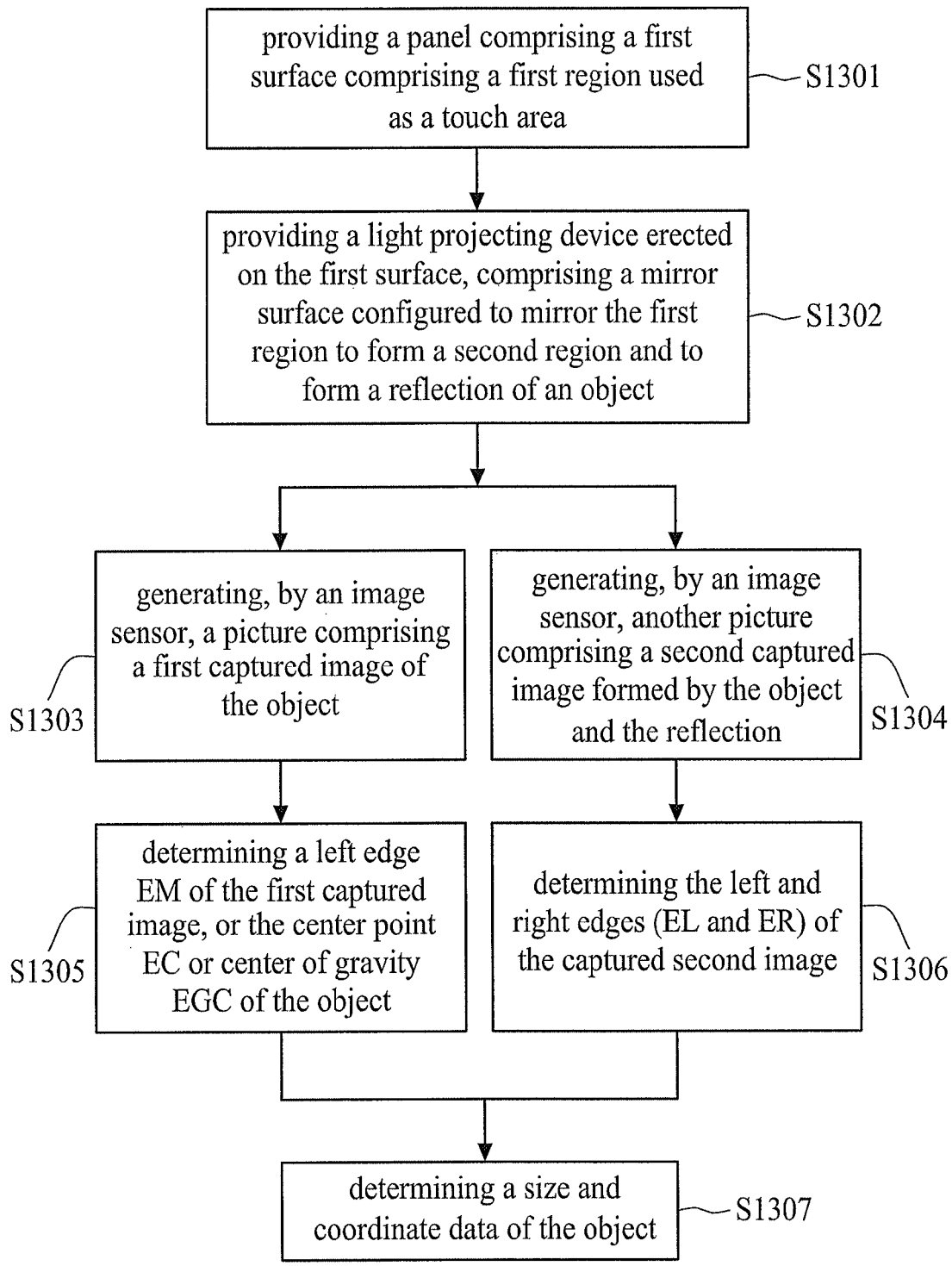
FIG. 13 is a flow chart related to a method of calculating coordinate data of an object according to one embodiment of the present invention.
Figure 14:
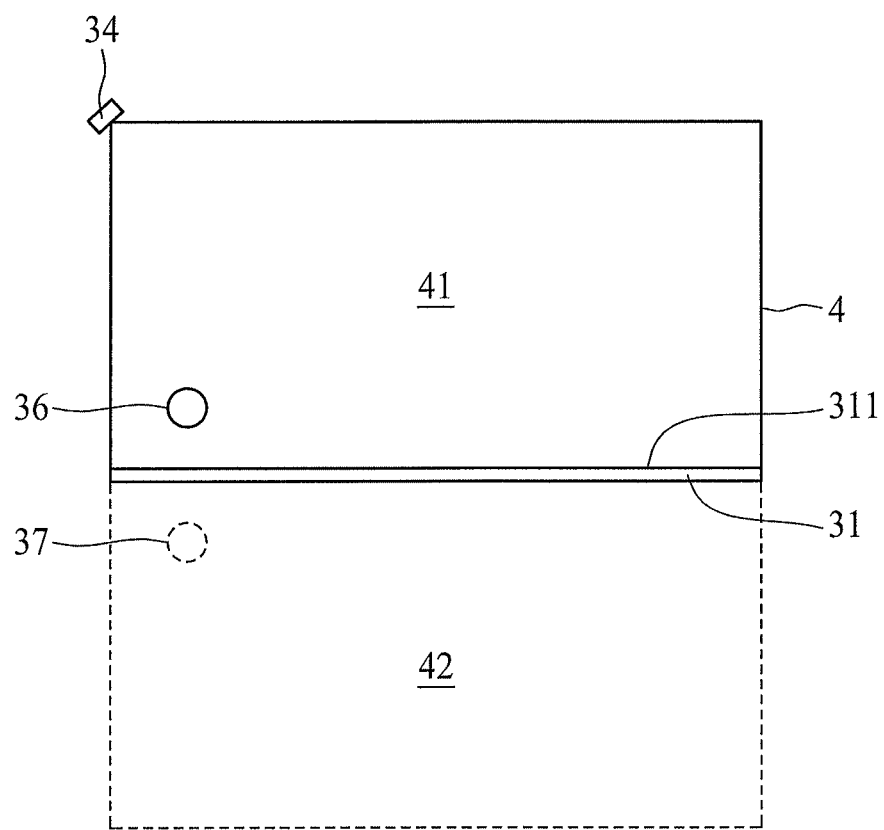
FIG. 14 is an illustration schematically depicting an optical touch system according to one embodiment of the present invention.

FIG. 13 is a flow chart related to a method of calculating coordinate data of an object according to one embodiment of the present invention. FIG. 14 is an illustration schematically depicting an optical touch system according to one embodiment of the present invention. Referring to FIGS. 13 and 14, at Step S1301, a panel 4 is provided. The panel 4 comprises a first surface, which includes a first region 41 used as a touch area.

At Step 1302, a light projecting device 31 is provided. The light projecting device 31 is erected on the first surface. The light projecting device 31 comprises a mirror surface 311 configured to mirror the first region 41 to form a second region 42. The mirror surface 311 forms a reflection 37 of an object 36.

Figure 15:
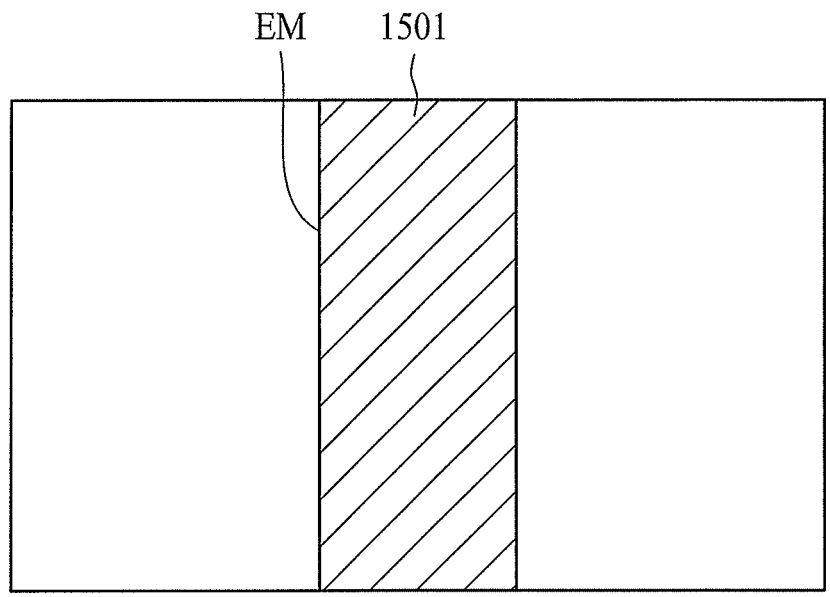
FIG. 15 schematically demonstrates a picture generated by the optical touch system of FIG. 14.

At Step S1303, the image sensor 34 generates a picture, which comprises a first captured image 1501 of the object 36 as shown in FIG. 15.

Figure 16:
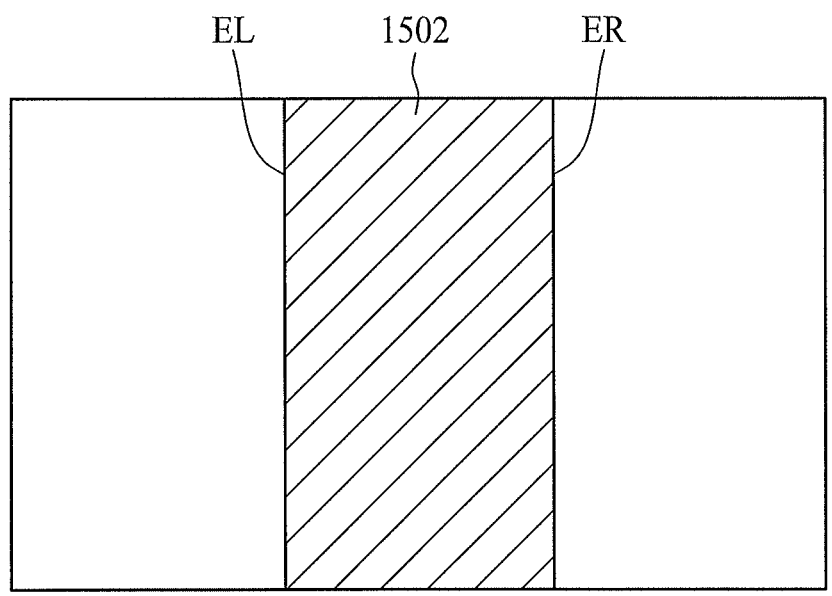
FIG. 16 schematically demonstrates another picture generated by the optical touch system of FIG. 14.

At Step S1304, the image sensor 34 generates another picture comprising a second captured image 1502 formed by the object 36 and the reflection 37 together, as shown in FIG. 16.

At Step S1305, a left edge EM of the first captured image 1501 is determined. In one alternative embodiment, as shown in FIG. 17, a center point (EC) 91 or a center of gravity (EGC) 92 of the object 36' is determined.

At Step S1306, the left and right edges (EL and ER) of the captured second image 1502 are determined.

At Step S1307, in one embodiment, the positions of the edges EM, EL and ER are used to determine a dimension and coordinate data of the object 36. In another embodiment, the positions of the center point EC and the edges (EL and ER) are used to determine a dimension and coordinate data of the object 36'. In yet another embodiment, the center of gravity EGC and the edges (EL and ER) are used to determine a dimension and coordinate data of the object 36'.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

It will be apparent to those skilled in the art that various modifications can be made to the disclosed embodiments. It is intended that the specification and examples be considered as exemplary only, with the true scope of the disclosure being indicated by the following claims and their equivalents.

What is claimed is:

1. A method of calculating coordinate data of an object, comprising the steps of:
    providing a light projecting device comprising a mirror surface configured to generate a reflection of an object;
    providing an image sensor for capturing an image of the object and an image of the reflection, wherein a height of the image of the reflection is less than that of the image of the object;
    determining an exposed portion of an edge of the image of the object within an overlapped image formed by the image of the object and the image of the reflection when the overlapped image is detected; and
    providing a light filter device covering a portion of a light receiving surface of the image sensor and configured to block light of a first frequency spectrum, wherein the light projecting device comprises a light filter member disposed on the mirror surface and configured to let the light projecting device reflect light of the first frequency spectrum.

2. The method of claim 1, wherein the light projecting device further comprises a non-mirror surface, wherein the mirror surface and the non-mirror surface are arranged in a direction perpendicular to a touch surface.

3. The method of claim 2, wherein the light projecting device comprises a light source configured to produce light emitting outward through the non-mirror surface.

4. The method of claim 1, further comprising the steps of;
    determining two first viewing lines according to two edges of the overlapped image;
    determining a second viewing line according to the exposed portion of the edge, a center of gravity of the image of the object, or a center point of the image of the object; and
    determining coordinate data of the object according to the two first viewing lines and the second viewing line.

5. The method of claim 4, further comprising a step of determining a size of the object according to the two first viewing lines and the second viewing line.

6. An optical touch system comprising:
    a light projecting device comprising a mirror surface configured to generate a reflection of an object;
    an image sensor configured to capture an image of the object and an image of the reflection or to capture an individual image of the object;
    a processor configured to calculate, when the image of the object and the image of the reflection form an overlapped image, coordinate data of the object according to the overlapped image and a center of gravity or a center point of the individual image, or according to two edges of the overlapped image and an exposed portion of an edge of the image of the object within the overlapped image; and
    a light filter device covering a portion of a light receiving surface of the image sensor and configured to block light of a first frequency spectrum, wherein the light projecting device comprises a light filter member disposed on the mirror surface and configured to let the light projecting device reflect light of the first frequency spectrum.

7. The optical touch system of claim 6, wherein the processor is configured to:
    determine two first viewing lines according to the two edges of the overlapped image;
    determine a second viewing line according to an edge of the individual image that is correspondingly hidden in the overlapped image or the exposed portion of the edge of the image of the object, or to a center of gravity or a center point of the individual image; and
    determine the coordinate data of the object according to the two first viewing lines and the second viewing line.

8. The optical touch system of claim 6, wherein the light projecting device comprises a light source producing light emitting outward through the mirror surface.

9. The optical touch system of claim 8, further comprising a control device coupled with the light source, wherein the processor is configured to drive the control device to make the light source produce light when the image of the object and the image of the reflection overlap.

10. The optical touch system of claim 8, wherein the processor is configured to determine a dimension of the object according to the two first viewing lines and the second viewing line.

11. The optical touch system of claim 6, further comprising a touch surface, wherein the light projecting device comprises a non-mirror surface, and the mirror surface and the non-mirror surface are arranged in a direction perpendicular to the touch surface.

* * * * *